(12) United States Patent
Song (10) Patent No.: US 11,184,529 B2
(45) Date of Patent: Nov. 23, 2021

(54) SMART RECORDING SYSTEM (71) Applicant: AINEMO INC, Beijing (CN)

(72) Inventor: Chenfeng Song, Las Vegas, NV (US)

(73) Assignee: AINEMO Inc., Beijing (CN)

( * ) Notice: Subject to any disclaimer, the term of this patent is extended or adjusted under 35 U.S.C. 154(b) by 912 days.

(21) Appl. No.: 15/321,490

(22) PCT Filed: Sep. 15, 2014

(86) PCT No.: PCT/CN2014/086575
§ 371 (c)(1),
(2) Date: Nov. 6, 2017

(87) PCT Pub. No.: WO2015/196584
PCT Pub. Date: Dec. 30, 2015

(65) Prior Publication Data
US 2020/0137297 A1 Apr. 30, 2020

(30) Foreign Application Priority Data

Jun. 26, 2014 (CN) .......................... 201410295579.9

(51) Int. Cl.
H04N 5/232 (2006.01)
H04N 5/222 (2006.01)

(52) U.S. Cl.
CPC ....... *H04N 5/23219* (2013.01); *H04N 5/2226* (2013.01); *H04N 5/23218* (2018.08); *H04N 5/23222* (2013.01); *H04N 5/23225* (2013.01)

(58) Field of Classification Search
None
See application file for complete search history.

(56) References Cited

U.S. PATENT DOCUMENTS 6,141,611 A * 10/2000 Mackey ................. G07C 5/008
340/438
6,630,884 B1 * 10/2003 Shanmugham ...... G07C 5/0891
340/436

(Continued)

FOREIGN PATENT DOCUMENTS

CN 1953516 A 4/2007
CN 101047836 A 10/2007

(Continued)

OTHER PUBLICATIONS

English-language abstract of Chinese Patent Application No. CN 102427507 A.

(Continued)

*Primary Examiner* — Cynthia Segura
(74) *Attorney, Agent, or Firm* — Jenkins, Wilson, Taylor & Hunt, P.A.

(57) ABSTRACT

The present invention discloses a smart recording system, comprising: a video capture unit, configured to capture video of the surrounding environment; an audio capture unit, configured to capture audio of the surrounding environment; a recording device, configured to respond to a specific action or specific action of a person or specific action of a specific person, identified in the captured video or audio: the video and audio captured by the video capture unit and audio capture unit behind the identified specific action or specific action of a person or specific action of a specific person are recorded to a fixed storage area by the recording device, and when the identified specific action or action of a specific person or specific action of a specific person ends, the recording device responds and stops recording to the fixed storage area. In contrast to the prior art, the present invention does not rely on a user's activation operation, and smartly (Continued)

records certain moments for the user, improving intelligence and convenience in recording.

17 Claims, 2 Drawing Sheets

(56) References Cited

U.S. PATENT DOCUMENTS

| | | | | |
|---|---|---|---|---|
| 8,817,118 | B2* | 8/2014 | Hatanaka | G06K 19/0723 |
| | | | | 348/211.4 |
| 9,407,804 | B2* | 8/2016 | Kawai | G11B 27/28 |
| 10,142,483 | B2* | 11/2018 | Li | H04M 3/568 |
| 10,276,187 | B2* | 4/2019 | Gross | B60R 25/302 |
| 10,341,605 | B1* | 7/2019 | Vanman | H04N 21/234345 |
| 10,445,587 | B2* | 10/2019 | Song | G06K 9/6277 |
| 2001/0052851 | A1* | 12/2001 | Mathias | G07C 9/28 |
| | | | | 340/573.1 |
| 2003/0169906 | A1* | 9/2003 | Gokturk | G06K 9/00201 |
| | | | | 382/115 |
| 2005/0225659 | A1* | 10/2005 | Kazami | G11B 27/326 |
| | | | | 348/333.12 |
| 2007/0257794 | A1 | 11/2007 | Fano et al. | |
| 2008/0037514 | A1* | 2/2008 | Goodman | H04L 65/1083 |
| | | | | 370/352 |
| 2008/0122920 | A1* | 5/2008 | Chang | H04N 5/76 |
| | | | | 348/14.01 |
| 2008/0220809 | A1* | 9/2008 | Hansen | G03B 9/64 |
| | | | | 455/550.1 |
| 2008/0297588 | A1 | 12/2008 | Kurtz et al. | |
| 2012/0207356 | A1* | 8/2012 | Murphy | H04N 1/00336 |
| | | | | 382/115 |
| 2012/0314018 | A1* | 12/2012 | Wengrovitz | H04N 7/181 |
| | | | | 348/14.08 |
| 2012/0316680 | A1* | 12/2012 | Olivier, III | G05D 1/0246 |
| | | | | 700/258 |
| 2013/0007788 | A1* | 1/2013 | Levinson | G08B 25/005 |
| | | | | 725/13 |
| 2013/0049950 | A1* | 2/2013 | Wohlert | H04L 12/1845 |
| | | | | 340/531 |
| 2013/0194438 | A1* | 8/2013 | Sweet, III | G06K 9/00221 |
| | | | | 348/207.1 |
| 2013/0245827 | A1* | 9/2013 | Shetty | B25J 19/023 |
| | | | | 700/259 |
| 2014/0055610 | A1* | 2/2014 | Ko | G06K 9/00771 |
| | | | | 348/143 |
| 2014/0062866 | A1 | 3/2014 | Yamashita | |
| 2015/0127628 | A1* | 5/2015 | Rathod | G06F 16/955 |
| | | | | 707/710 |
| 2015/0139504 | A1* | 5/2015 | Kurosawa | G06K 9/00335 |
| | | | | 382/107 |
| 2016/0261929 | A1* | 9/2016 | Lee | G06K 9/00724 |
| 2017/0195386 | A1* | 7/2017 | Nathan | H04L 65/4084 |
| 2018/0012460 | A1* | 1/2018 | Heitz, III | G08B 13/19684 |
| 2018/0012462 | A1* | 1/2018 | Heitz, III | G08B 13/19634 |
| 2018/0131899 | A1* | 5/2018 | Song | H04N 7/18 |
| 2018/0227360 | A1* | 8/2018 | Liu | H04L 69/18 |
| 2018/0253954 | A1* | 9/2018 | Verma | G06F 3/017 |
| 2019/0236377 | A1* | 8/2019 | Otake | G06K 9/00335 |
| 2020/0019788 | A1* | 1/2020 | Lo | G06K 9/00771 |
| 2020/0137358 | A1* | 4/2020 | Fernandez Orellana | |
| | | | | H04L 67/125 |

FOREIGN PATENT DOCUMENTS

| | | |
|---|---|---|
| CN | 101479680 A | 7/2009 |
| CN | 101808226 A | 8/2010 |
| CN | 102403007 A | 4/2012 |
| CN | 102427507 A | 4/2012 |
| CN | 101479680 B | 5/2012 |
| CN | 102881288 A | 1/2013 |
| CN | 103093654 A | 5/2013 |
| CN | 103677251 A | 3/2014 |
| CN | 104038717 A | 9/2014 |
| CN | 104038717 B | 11/2017 |
| WO | WO 2007014216 A2 | 2/2007 |
| WO | WO 2015/196584 A1 | 12/2015 |

OTHER PUBLICATIONS

English-language abstract of Chinese Patent Application No. CN 103093654 A.
English-language abstract of Chinese Patent Application No. CN 104038717 A.
First Office action issued in parallel Chines Patent Application No. 2014102955799, dated Sep. 27, 2016, 10 pages.
International Search Report and Written Opinion for Application No. PCT/CN2014/086575 dated Mar. 27, 2015.
Chinese Office Action for Application No. 201410295579 dated Apr. 6, 2017.

* cited by examiner

SMART RECORDING SYSTEM

This application claims the benefit of a Chinese patent application No. 201410295579.9 filed on Jun. 26, 2014, with the title "SMART RECORDING SYSTEM," the entire content of which is incorporated herein by reference.

TECHNICAL FIELD

The present invention relates to the field of information technology, and more particularly to a smart recording system.

BACKGROUND

The current home computer, are generally equipped with a camera, recording system. When users need to shoot a video, record a sound, the user manually start the camera's video function or recording system's recording function. However, there are always some great moments in family life. For example, a child's beautiful dance: boyfriend's suddenly romantic marriage proposal. These moments are not reproducible, too late to be prepared in advance. Due to the user need to manually start the camera's video function and have time to shoot, resulting in many wonderful moments are therefore missed.

SUMMARY

One of the technical problems to be solved by the present invention is to smartly record certain moments for a user without depending on the user's starting operation.

According to one embodiment of an aspect of the present invention, there is provided a smart recording system comprising:
  a video capture unit configured to capture video of the surrounding environment:
  an audio capture unit configured to capture audio of a surrounding environment;
  a recording device, configured to respond to a specific action or specific action of a person or specific action of a specific person, identified in the captured video or audio: the video and audio captured by the video capture unit and audio capture unit behind the identified specific action or specific action of a person or specific action of a specific person are recorded to a fixed storage area by the recording device, and when the identified specific action or action of a specific person or specific action of a specific person ends, the recording device responds and slops recording to the fixed storage area.

Optionally, the recorder is configured to record video and audio captured by the video capture unit and the audio capture unit in real time to the pre-storage area, wherein the pre-storage area has a predetermined storage capacity, the post-recorded video and audio automatically overwrite the oldest recorded video and audio in the pre-storage area if the storage capacity is full, and the recorder is configured to identify, in response to determining that the action identified from the captured video and audio has a specific attribute, the action with the specific attribute from the video and audio stored in the pre-storage area, and copy the identified video and audio of the action with that specific attribute to a fixed storage area.

Optionally, a model is previously established for various actions, and the recorder Searches the captured video and audio captured by the video capture limit and the audio capture unit for matches to each model to identify actions from the captured video and audio.

Optionally, the smart recording system is further comprising a depth sensor, the action is identified by basing on video and audio respectively captured by the video capture unit, the audio capture unit and the depth sensed by the depth sensors.

Optionally, the specific person is identified based on one or more of face recognition, height recognition, voice recognition.

Optionally, the smart recording system is further comprising: a transceiver configured to send notification information to a trusted user in response to identifying a specific action from the captured video and audio, or a specific person's action, or a specific person's specific action.

Optionally, the smart recording system further comprises a transceiver configured to send the recorded content to a trusted user in response to stopping the recording.

Optionally, the smart recording system further comprises: a rotating device for rotating the video capture unit.

Optionally, in response to identifying a specific action, or a specific person's action, or a specific person's specific action from the captured video and audio, the rotating device causes the video capture unit to be rotated in the direction of facing a specific action identified, or a specific person's action, or a specific person's specific action to facilitate recording.

According to an embodiment of another aspect of the present invention, there is also provided a smart recording system comprising:
  a video capture unit configured to capture video of the surrounding environment;
  an audio capture unit configured to capture audio of a surrounding environment;
  a recorder configured, in response to identifying an action from the captured video and audio and further determining whether the action has a specific attribute, in response to determining that the action has a specific attribute, the video and audio captured by the video capture unit and the audio capture unit are recorded to a fixed storage area and recording to the fixed storage area is stopped in response to the end of the action.

Optionally, the recorder is configured to record video and audio captured by the video capture unit and the audio capture unit in real time to live pre-storage area, wherein the pre-storage area has a predetermined storage capacity, the post-recorded video and audio automatically overwrite the oldest recorded video and audio in the pre-storage area if the storage capacity is full, and the recorder is configured to identify, in response to determining that the action identified from the captured video and audio has a specific attribute, the action with the specific attribute from the video and audio stored in the pre-storage area, and copy the identified video and audio of the action with that specific attribute to a fixed storage area.

Optionally, the specific attribute comprises at least one of:
  dramatic changes in the video captured by the video capture unit
  audio captured by the audio capture unit above a certain threshold;
  a dramatic change in audio captured by the audio capture unit.

According to an embodiment of another aspect of the present invention, there is also provided a smart recording system comprising:
  a video capture unit configured to capture video of the surrounding environment;

an audio capture unit configured to capture audio of a surrounding environment;

a recorder configured to respond to an action of recognizing an action from the collected video and audio and further determining whether the action is an action that has never been identified before or an action of which the identified number of times is less than a specific threshold, after it is determined that the action is an action that has never been recognized or whose number of times of recognition is less than a specific threshold, the action will be determined to be an action that has never been recognized or an action that has been identified less than a certain threshold, then the video and audio captured by the video capture unit and the audio capture unit are recorded to a fixed storage area and the recording to the fixed storage area is stopped in response to the recognition that the action has ended.

Optionally, the recorder is configured to record the video and audio captured by the video capture unit and the audio capture unit in real time to a pro-storage area, wherein the pre-storage area has a predetermined storage capacity, the post-recorded video and audio automatically overwrite the oldest recorded video and audio in the pre-storage area if the storage capacity is full, and the recorder is configured to, in response to determining that the action identified in the video and audio captured from the video capture unit and the audio capture unit is a previously unidentified action or number of times of recognition is less than a specific threshold, the video and audio of the action are identified in the video and audio stored in the pro-storage, and the identified video and audio of the action are copied to the fixed storage.

Optionally, a corresponding counter is set for various actions in the recorder, and in response to identifying an action from the captured video and audio, the recorder has the counter corresponding to the action incremented by one, wherein the judgement on w whether the action is an action which has never been recognized before or an action of which the number of times of recognition is less than a specific threshold is determined by referring to the counter.

According to an embodiment of another aspect of the present invention, there is also provided a smart recording system comprising:

a video capture unit configured to capture video of the surrounding environment;

an audio capture unit configured to capture audio of a surrounding environment;

a recorder configured to, in response to identifying a specific person's action from the captured video and audio and further to determine whether the action is a previously unidentified action of the specific person, or the number of times of recognition is less than a certain threshold; in response to determining that the action is a previously unknown action of the specific person or an action of which the number of times of recognition is less than a specific threshold, determining that the action is a previous unrecognized action, or the number of times of recognition is less than a certain threshold, thereafter store the video and audio captured by the video capture unit and the audio capture unit to the fixed storage area; when the action is finished, stop recording to the fixed storage.

Optionally, the recorder is configured to record video and audio captured by the video capture unit and the audio capture unit in real time to a pre-storage area, wherein the pre-storage area has a predetermined storage capacity, the post-recorded video and audio automatically overwrite the oldest recorded video and audio in the pre-storage area if the storage capacity is full, and the recorder is configured to, in response to determining that the action of a specific person identified in the video and audio captured from the video capture unit and the audio capture unit is one that the specific person has never previously identified or the number of times of recognition less than a specific threshold, identifying video and audio with the action of the specific person in the video and audio stored in the pre-storage, video and audio about the action of a specific person are copied to a fixed storage area.

Optionally, a corresponding counter is set for various actions in the recorder, and in response to identifying an action from the captured video and audio, the recorder has the counter corresponding to the action incremented by one, wherein the judgement on whether the action is an action which has never been recognized before or an action of which the number of times of recognition is less than a specific threshold is determined by referring to the counter.

Compared with the prior art, the embodiment of the present invention achieves at least one of the following beneficial effects:

An advantage of a smart recording system provided by one embodiment of the present invention is that: by recording information in responding to a specific action identified from the captured video and audio, or a specific person's actions, or a specific persons specific actions, it can be achieved that the user can be smartly recorded without requiring a manual action. For example, that the user only wants to know the activities of a specific person (e.g., cleaning is done at home every month and the user wants to know about the cleaning work); or the user only wants to know the execution of a certain type of action (for example, the user wants to know the status of all tire family members watching TV); or the user only wants to know the situation in which a specific person performs a specific action (for example, when the father wants to know if the child is doing homework).

It may be that the action has started when a specific action, a specific action, or a specific action of a specific person is recognized because of the recognition of a specific action or the action of a specific person or the specific action of a specific person need time to achieve. In order to record the complete video and audio of this action, an embodiment of the present invention provides a smart recording system having pro-stored functions. The video and audio are pre-store for a period of time, and when recognizing a specific action or a specific action of a specific person or a specific action of a specific person, search for the part corresponding to the action from the stored video and audio of this period of time. This part of the video and audio is the part missed due to the need for time to recognize an action, and is not recorded to the fixed storage area. One embodiment of the present invention automatically adds this portion of video and audio back to the fixed storage for seamless integration with the video and audio recorded in the fixed storage to achieve the benefits of more complete video and audio recording.

Since the smart recording system provided by one embodiment of the present invention further includes a depth sensor capable of sensing a distance between a person performing an action and a smart recording system. Due to the same magnitude of action, the range of action in the video captured by the video capture unit varies with the distance between the person doing the action and the smart recording system. Therefore, combining the depth sensor can realize the beneficial effects of more accurately recognizing the movement.

One embodiment of the present invention may also identify people based on one or more of face recognition, height recognition, and voice recognition. By comprehensively identifying people in many aspects, the beneficial effects of improving the accuracy of recognizing a person may be obtained.

Since the transceiver of the smart recording system provided by one embodiment of the present invention may respond to the identified specific action, the action of a specific person or the specific action of a specific person, and send the notification information to the trusted user, thus gaining the beneficial effect of being able to know the situation in the home that the user is interested in, for example, when he or she is not at home.

Since the transceiver of the smart recording system provided by one embodiment of the present invention can respond to stop recording, and send the recorded content is sent to a trusted user, thus gaining the benefit of being able to view the entire process at home, which is of interest to the user, for example when the user is not at home.

Further, the rotating device can be rotated accordingly according to the specific action that has been identified, or the action of the specific person, or the specific action of the specific person. For example, the picture taken in this way is always directed against the action to achieve the benefit of making the captured video clearer.

In contrast to the prior art, a smart recording system provided by another embodiment of the present invention responds to actions identified from captured video and audio, and further determine whether the action has a specific attribute. In response to determining that the action has a specific attribute, recording begins, and stop recording in response to the end of the action. The beneficial effect of this is that the setting of certain attributes can be used to achieve some situations that are unusual in the home. For example, when some person gets angry, earthquake, robbery, etc., the current situation will be recorded as soon as possible, so as to find out the cause or form evidence afterwards.

Compared with the prior art, a smart recording system provided in still another embodiment of the present invention. In response to identifying an action from the captured video and audio and further determining whether the action is a previously unrecognized action or an identified number of times less than a specific threshold. In response to determining that the action is a previously unidentified action or an identified number of times less than a specific threshold, recording begins; and stop recording in response to the end of the action. The beneficial effect of doing so is that it can promptly record some of the highlights of family members that have never seen or occurred in rare occasions. For example, a child suddenly performing a beautiful dance; boyfriend's romantic marriage proposal. These moments are not reproducible, too late to be prepared in advance. User has to manually start the camera to record, which may miss the exciting moment. By automatically recording action that has never been recognized before or whose number of recognitions is less than a specific threshold, special instantaneous recordings that are too late for manual start of recording can be recorded to enhance the user experience.

Compared with the prior art, the present invention further provides a smart recording system, which start recording when recognizing a specific person's action from the captured video and audio, and further determining if the action is a previously unidentified action of the specific person; or the identified number of limes is less than a specific threshold in response to determining that the action is a previously unrecognized action of the specific person; or the recognized number of times is less than a specific threshold; and stop recording in response to the end of the action. For some people, some of its actions or moments of encounter may only be improvised, there will be no such actions in future. For example, someone never danced but suddenly whipped a dance. Such a moment is worth a bit more than a dancer to dance for one day. Therefore, the present embodiment achieves the beneficial effect of customizing a collection specifically tailored for a specific person to capture and make a precious moment for that specific person.

Those of ordinary skill in the art will understand that although the following detailed description will be made with reference to the illustrated embodiments and the accompanying drawings, the present invention is not limited to these embodiments. Rather, the scope of the invention is to be broadly extended, and is intended to define the scope of the invention only by the appended claims.

BRIEF DESCRIPTION OF THE DRAWINGS

Other features, objects, and advantages of the present invention will become apparent by reading the following detailed description of the non-limiting embodiments regarding the following drawings.

The same or similar reference numbers in the drawings represent the same or similar components.

DETAILED DESCRIPTION

The invention will now be described in further detail with reference to the accompanying drawings.

Figure 1:
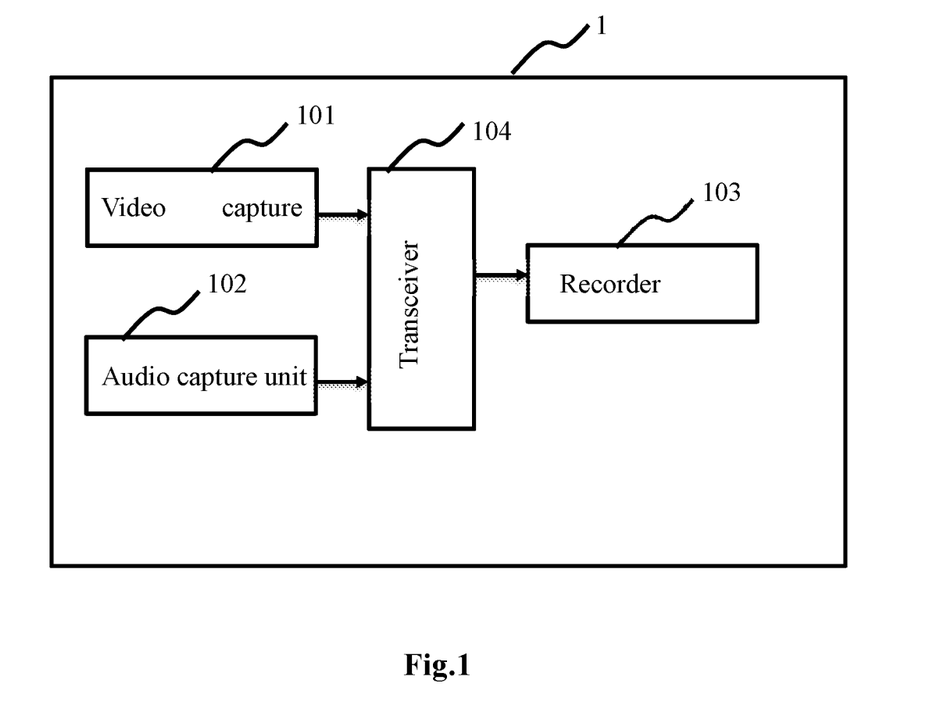
FIG. 1 shows a schematic block diagram of a smart recording system according to one embodiment of the present invention.

FIG. 1 shows a schematic block diagram of a smart recording system 1 according to one embodiment of the present invention. According to FIG. 1, the smart recording system 1 comprises:

a video capture unit 101 configured to capture video of the surrounding environment:

an audio capture unit 102 configured to capture audio of a surrounding environment;

a recorder 103 is configured to respond to identifying a specific action from the captured video and audio, or a specific person's action, or a specific person's specific action. The video and audio captured by the video capture unit 101 and the audio capture unit 102 will be recorded to a fixed storage area after a specific action, or action of a specific person, or a specific action of a specific person be identified; and stops recording to the fixed storage area in response to recognizing the specific action, the action of the specific person, or the termination of the specific action of the specific person.

The fixed storage area is used to smartly record some instantaneous storage space for the user, independent of the user's startup operation, as in the technical problem solved by the present invention. When users later want to review these moments, simply replay the contents of the fixed storage area on it. It can be a stand-alone storage or a portion of storage.

Figure 2:
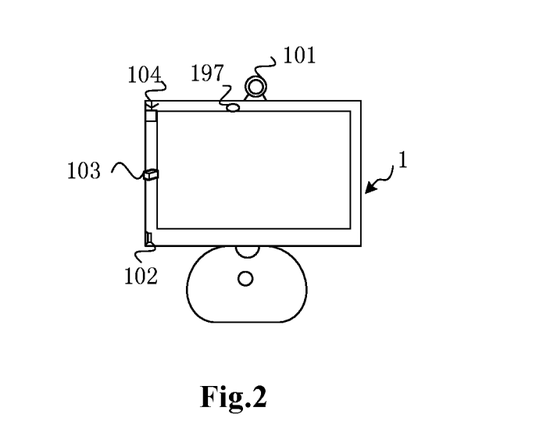
FIG. 2 shows an external front view of a smart recording system according to one embodiment of the present invention.

Here, the smart recording system may lake the form of a personal computer in FIG. 2, a mobile terminal, a processing system in which several personal computers are connected, and the like. The video capture unit 101 may include a device having a video capture function such as a camera. As shown in FIG. 2, it can be a camera in the upper pan of the smart recording system, or it can take the form of a stand-alone camera, and so on. The audio capture unit 102 includes any device having an audio capture function, which may be an audio capture until embedded in the smart recording system of FIG. 2 that receives audio through a recording aperture on the surface of the smart recording system. Recorder 103 may be a separate storage plus control means for recording to storage. Of course, the recorder 103 can also be a storage with control means. The recorder 103 may also be merely a storage control unit, the storage being external to the smart recording system and only connected to the smart recording system when using the smart recording system.

For example, cleaners come home every month and users want to know when they are cleaning jobs. It is not necessary at this time for the camera to be constantly working monthly, recording video and audio for each moment, and only recording the completion of cleaning at home when cleaning occurs at home. At this time, it may be arranged to allow the recorder to start recording in response to recognizing the action of the cleaner or cleaner; and stop recording when the action of cleaning away from home or cleaning ends. In this way, you can see after cleaning is responsible, or when there is n dispute in advance of the evidence.

For example, users do not want all their family members to watch TV for too long, and the recorder can be pro-configured to recognize the action of watching TV at home. No matter who watched TV, they recorded the complete video of their watching TV for later review. At this point, the system of the present invention that responds to the start of recording of a certain type of action very well satisfies this need of many current users.

For another example, a father just wanted to supervise Jessica doing homework, did not want to supervise other people and other things, and there was no need for the camera to keep filming and keep a record of all the scenes in the family. At this point my dad can set the recorder to record only for Jessica's homework. The system of the present invention that begins recording in response to a specific action of a specific person very well meets this need of many current users.

The smart recording system may have a display, as shown in FIG. 2. On the monitor, user-configurable screens can be displayed, for example allowing the user to select the person and action to be recorded. For example, if the father wants to monitor Jessica's homework, the father can select Jessica from the drop-down menu of options "People" and select a homework from the drop-down menu of "Actions". If the father wanted to watch all the family members watching TV, select "Unlimited People" from the "People" drop-down menu; or do not select anyone, and choose to watch TV in the drop-down menu of the "Actions" option.

The pattern and/or height and/or sound frequency of a specific human face is used to pre-capture and enter the smart recording system. For example, a display on the monitor lets the user capture a video and audio for a specific person. The smart recording system analyzes video and audio. The face pattern and/or height and/or sound frequency of the specific person are analyzed and stored in a storage (not shown). A specific person may be identified based on one or more of face recognition, height recognition, voice recognition. When a certain area in the collected video matches the stored pattern of the face of the specific person and/or in combination with other auxiliary sensing devices, the height of the face is matched with the stored height, the existence of a specific person is identified; and/or the matching of the audio collected by the audio capture unit 102 and the stored frequency of the specific person's sound match, the existence of a specific person is identified.

A variety of actions are also pre-built models stored in storage. For example, for an action such as watching television, a model is created in advance in storage: identifying a person sitting on a sofa; looking down the person's gaze, there is an object; identifying that the object is a television; slaying on television for at least 10 seconds. If a person is detected from the image captured by the video capture unit 101 and then detected as being seated on a sofa (the recognition of the sofa resembles face recognition can also be performed by pattern matching or the image of the person sitting on the sofa as a whole as an object for pattern matching recognition) and then detect the person's gaze direction and then detect whether the person's gaze direction is on the television (e.g., the television is modeled as an object), and if so, count for 10 seconds. In this way, the recorder 103 identifies the action from the captured video and audio by searching the video and audio captured by the video capture unit 101, the audio capture unit 102 for a match with each model.

Recognizing a person or a specific person's action may also adopt a self-learning method. The way of self-learning is not limited herein. In the self-learning mode, the pattern and/or height and/or sound frequency of a specific person's face may not be stored in a storage (not shown) in advance.

No limitation is made to the way the smart recording system 1 identifies a person or a specific person. Any device or unit having an identification person or a specific person, which is applicable to the present invention, should be included in the protection scope of the present invention, hereby incorporated by reference herein.

Optionally, the recorder 103 is configured to record video and audio captured by the video capture unit 101 and the audio capture unit 102 to a pre-storage area in real time, wherein the pre-storage area has a predetermined storage capacity, and when the storage capacity is full, the recorded video and audio automatically overwrites the earliest recorded video and audio in the pre-storage and the recorder 103 is configured to, in response to identifying a specific action from the captured video and audio, or a specific person's action, or specific action of a specific person, videos and audios with the specific action, or a specific person's action, or a specific person's specific action are identified in the video and audio stored in the pre-storage area, and the identified videos and audio with the specific action, or a specific person's actions, or a specific person's specific actions are copied to a fixed storage area.

The pre-storage area can be an independent storage, it can also be part of the storage space. Its role is to pre-record for the user several hours (corresponding to the above storage capacity) of the video and audio. Actually, the action has started when a specific action, or a specific action, or a specific action of a specific person is recognized from the captured video and audio. In order to record the complete action, you need to set up a pre-storage area that always caches video and audio for several hours. When video and audio with the specific action, or a specific person's action, or a specific person's specific action are identified from the stored video and audio, the video and audio corresponding to the action in the pre-cached video and audio is loaded or copied to the fixed storage area, the equivalent of a predetermined amount of video recorded in advance completely fixed storage area seamlessly with the video, making the video display more complete.

Optionally, referring to FIG. 2, the smart recording system 1 further includes a depth sensor 197. The actions are identified based on the video and audio captured by the video capture unit 101 and the audio capture unit 102 respectively and the depth sensed by the depth sensor 107. Optionally, the action is to search for the matching identification with the established model from the video and audio captured respectively by the video capture unit 101 and the audio capture unit 102 by establishing an action model in advance. Optionally, the model is a pre-input standardized model. However, although the depth sensor 197 is located to the left of the upper border of the display in FIG. 2, it may be disposed at other reasonable physical locations. When an action takes place, the magnitude of the change in the captured image will be different for the same range of action due to the distance from the smart recording system 1.

Optionally, the smart recording system 1 further includes a transceiver 104 configured to respond to identifying a specific action, or a specific person's action, or a specific person's specific action from the captured video and audio. A notification message is sent by transceiver 104 to a trusted user telling the frosted user (hut a specific action, a specific person's action, or a specific person's specific action occurred on the smart recording system 1 side. Let trusted users know the situation in advance. The transceiver 104 may be an antenna, for example, or may be another transceiver, such as a built-in wireless transceiver module. The trusted user may be preset by a user, or may be adaptively adjusted or self-determined by the smart recording system according to the communication frequency, friend information, family relationship, etc., and is not limited herein. Further, the transceiver 104 may be further configured to send the recorded content to the trusted user in response to stopping the recording. So that trusted users can know the specific information recorded by the smart recording system in time. For example, in a real scene, the smart recording system 1 placed in the home recognizes the action of the child dancing through the video capture unit 101 and the audio capture unit 102. The notification information is sent to the remote trusted user (e.g., the father in the office) by the transceiver 104 in real lime or in real time. After recording a complete video of a child's dance, send the recorded video to the trusted user. Here, the format of the recorded content is not limited herein and may include mpg, avi, mpeg and the like. Here, the start recording system 1 sends notification information or recording content to trusted users mainly in a Wi-Fi network environment. Certainly, the trusted user may communicate with the smart recording system 1 through a communication manner such as a 3G network, a 2G network, a 4G network and the like.

Figure 3:
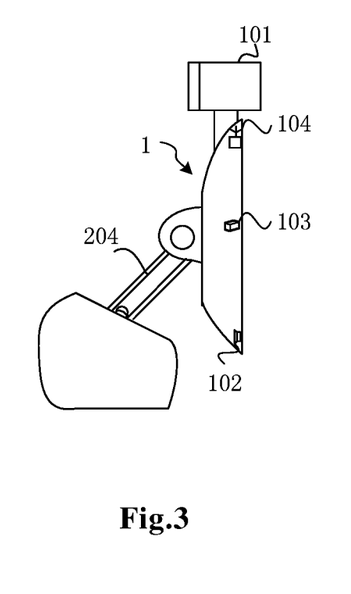
FIG. 3 shows an external left side view of a smart recording system according to one embodiment of the present invention.

Further, please refer to FIG. 3, which shows an external left side view of a smart recording system according to one embodiment of the present invention. According to FIG. 3, the smart recording system 1 may further include: a rotating device 204 for rotating the video capture unit 101, and the rotating device 204 may be turned up, down, left, and right. Further, the rotating device 204 may also be responsive to identifying a specific action, or a specific person's action, or a specific person's specific action from the captured video and audio, rotates the video capture unit 101 in the direction of facing a specific action recognized, or a action of a specific person, or a specific action of a specific person to facilitate recording, better capture specific actions, or actions of specific people, or specific actions of specific people.

Still referring to FIG. 1, according to a second embodiment of the present invention, a smart recording system 1 includes:
  a video capture unit 101 configured to capture video of the surrounding environment:
  an audio capture unit 102 configured to capture audio of a surrounding environment:
  a recorder 103 configured to respond to recognizing an action from the captured video and audio: and further determine whether the action has a specific attribute. In response to determining that the action has a specific attribute, the video and audio captured by the video capture unit 101 and the audio capture unit 102 will be recorded to a fixed storage area after it is determined that the action has a specific attribute, and recording to the fixed storage area is stopped in response to the action being ended.

In this way, through the setting of specific attributes, when the situation in the home is different from usual, for example, when someone is angry or robbery, the current situation can be recorded at the first time, so that it can be easily found reason or evidence afterwards.

For example, when a person is angry, since the recorded audio, for example, changes drastically at this time, the recorder determines that the action has a specific attribute and starts recording so that a person is automatically recorded without human activation for some special moments in the home.

Optionally, the recorder 103 is configured to record video and audio captured by the video capture unit 101 and the audio capture unit 102 in real time to a pre-storage area, where the pre-storage area has a predetermined storage capacity, and when the storage capacity is full the recorded video and audio automatically overwrites the earliest recorded video and audio in the pre-storage; and the recorder 103 is configured to, in response to determining that the action identified from the captured video and audio has a specific attribute, video and audio with an action having the specific attribute are identified in the video and audio stored in the pre-storage area, and the identified video and audio with the action having the specific attribute is copied to a fixed storage area.

Wherein, the specific attribute may include at least one of the following:
  a dramatic change of the video captured by the video capture unit 101:
  an audio captured by the audio capture unit 102 above a certain threshold:
  a dramatic change in audio captured by the audio capture unit 102.
  The specific attribute may not include the above items, but may be set by the user. For example, a drop-down menu is displayed on the display on which the user selects the scene he wishes to recognize and record.

In the second embodiment, the smart recording system may also establish a model for various actions in advance when recognizing actions. For example, for an action such as watching television, a model is created in advance in storage: identifying a person sitting on a sofa; looking down the person's gaze, there Is an object; identifying that the object is a television; staying on television for at least 10 seconds. If a person is detected from the image captured by the video capture unit 101 and then detected as being seated on the sofa (recognition of the sofa resembles face recognition, pattern matching may also be performed, and the image of the person sitting on a sofa as a whole as an object for pattern matching recognition), and then detect the direction of the person's gaze, and then detect whether the object in the gaze direction of the person is a television (e.g., the television is modeled as an object), and if so, count for 10 seconds. In this way, the recorder 103 identifies the action from the captured video and audio by searching the video and audio captured by the video capture unit 101, the audio capture unit 102 for a match with each model.

Like the first embodiment, the smart recording system in the second embodiment may also include a depth sensor 197. The actions are identified based on the video and audio captured by the video capture unit 101, the audio capture unit 102, and the depth sensed by the depth sensor 197, respectively.

Similar to the first embodiment, the smart recording system in the second embodiment may further include a transceiver 104 configured to send a notification to the trusted user in response to determining that the identified action has a specific attribute information. The setting of the trusted user is the same as that of the first embodiment. In this way, for example, when a crying daughter at home can send a notification message to his father in time via SMS, WeChat or e-mail, the father can deal with it promptly when he is not at home.

Similar to the first embodiment, the transceiver 104 may also be configured to send the recorded content in real time to the trusted user. For example, when a robbery occurs in your home, you can take a real-time view at your home by recording it locally while sending real-time video to her father's cell-phone via a transceiver while recording, and take appropriate action (dial 911, get back in time, etc.). It is also possible to send the entire recorded content to a trusted user after the recording is completed.

Similar to the first embodiment, the smart recording system in the second embodiment may further include a rotation device 204 that rotates the video capture unit 101.

Similar to the first embodiment, the rotating device 204 may also cause the video capture unit 101 to rotate in a direction facing the recognized action in order to facilitate recording in response to determining that the recognized action has a specific attribute.

Still referring to FIG. 1, according to a third embodiment of the present invention, a smart recording system 1 includes:
  a video capture unit 101 configured to capture video of the surrounding environment:
  an audio capture unit 102 configured to capture audio of a surrounding environment;
  a recorder 103 configured to respond to an action of recognizing an action from the collected video and audio and further determining whether the action is an action that has never been identified before or an action of which the identified number of times is less than a specific threshold, after it is determined that the action is an action that has never been recognized or whose number of times of recognition is less than a specific threshold, the action will be determined to be an action that has never been recognized or an action that has been identified less than a certain threshold, then the video and audio captured by the video capture unit 101 and the audio capture unit 102 are recorded to a fixed storage area and the recording to the fixed storage area is stopped in response to the recognition that the action has ended.

In this way, it can promptly record some of the highlights of family members that have never before seen or occurred in rare occasions. For example, a child suddenly performing a beautiful dance: boyfriend's romantic marriage proposal. These moments are not reproducible, too late to be prepared in advance. User must manually start the camera to record, which may miss the exciting moment. By automatically recording action that has never been recognized before or whose number of recognitions is less than a specific threshold special instantaneous recordings that are too late for manual start of recording can be recorded to enhance the user experience.

Optionally, the recorder 103 is configured to record video and audio captured by the video capture unit 101 and the audio capture unit 102 in real time to a pre-storage area, where the pre-storage area has a predetermined storage capacity, and when the storage capacity is full the recorded video and audio automatically overwrites the earliest recorded video and audio in the pre-storage: and the recorder 103 is configured to, in response to determining that the action identified in the video and audio captured from the video capture unit 101 and the audio capture unit 102 is a previously unidentified action or number of times of recognition is less than a specific threshold, the video and audio of the action are identified in the video and audio stored in the pre-storage, and the identified video and audio of the action are copied to the fixed storage.

Optionally, a counter is set for various actions in the recorder 103, and in response to identifying an action from the captured video and audio, the recorder 103 have the counter corresponding to the action incremented by one, wherein the judgement on whether the action is an action which has never been recognized before or an action of which the number of times of recognition is less than a specific threshold is determined by referring to the counter. As described about the first embodiment, a model is established in advance for various actions and stored in a storage. In this way, the recorder 103 identifies the action from tire captured video and audio by searching the video and audio captured by the video capture unit 101, the audio capture unit 102 for a match with each model. For example, the counter is initially initialized to zero. Then, the recorder 103 recognizes the action of watching TV based on the model matching. If the pre-setting is to start recording when the action has never been recognized before, the action of watching TV is recorded. At the same time, the counter plus 1. When the recorder 103 recognizes someone watching TV for the second time, if it is preset to start recording when the action has never been recognized before, since the value of the counter is not 0, it is not recorded. However, if it is preset to start recording when the recognized number of actions is less than or equal to 1, recording is still to be performed. At the same time, the counter value plus 1.

For example, if the action of recognizing a previously unknown child is judged from the collected video and audio, the recorder 103 starts recording in response to the recognized action, and the recorder 103 stops recording when the action of the child is finished.

Similar to the first embodiment, the smart recording system in the third embodiment may also include a depth sensor 197. The actions are identified based on the video and audio captured by the video capture unit 101, the audio capture unit 102, and the depth sensed by the depth sensor 197, respectively.

Similar to the first embodiment, the smart recording system in the third embodiment may further include a transceiver 104 configured to, in response to determining that the action was a previously unrecognized action or the number of times of recognition being less than a specific threshold, send a notification to trusted users.

Similar to the first embodiment, the transceiver 104 may also be configured to send the recorded content to a trusted user. It can be set to send to a trusted user after stopping recording, or set to send the recorded video to a trusted user in real time.

Similar to the first embodiment, the smart recording system in the third embodiment may further include a rotation device 204 that rotates the video capture unit 101.

Similar to the first embodiment, in response to determining that the action is an action that has never been recognized before or an action that number of limes of recognition is less than a specific threshold, the rotation device 204 rotates the video capture unit 101 in a direction facing the recognized action to facilitate record.

Still referring to FIG. 1, according to a fourth embodiment of the present invention, a smart recording system 1 includes:
 a video capture unit 101 configured to capture video of the surrounding environment:
 an audio capture unit 102 configured to capture audio of a surrounding environment:
 a recorder 103 configured to, in response to identifying a specific person's action from the captured video and audio and further to determine whether the action is a previously unidentified action of the specific person, or the number of limes of recognition is less than a certain threshold; in response to determining that the action is a previously unknown action of the specific person or an action of which the number of times of recognition is less than a specific threshold, determining that the action is a previous unrecognized action, or the number of times of recognition is less than a certain threshold, thereafter store the video and audio captured by the video capture unit 101 and the audio capture unit 102 to the fixed storage area; when the action is finished, stop recording to the fixed storage.

For some people, some of its actions or moments of encounter may only be improvised, there will he no such actions in future. For example, someone never danced but suddenly whipped a dance. Such a moment is worth a bit more than a dancer to dance for one day. Therefore, the present embodiment achieves the beneficial effect of customizing a collection specifically tailored for a specific person to capture and make a precious moment for that specific person.

Optionally, the recorder 103 is configured to record video and audio captured by the video capture unit 101 and the audio capture unit 102 in real time to a pre-storage area, wherein the pre-storage area has a predetermined storage capacity, the post-recorded video and audio automatically overwrite the oldest recorded video and audio in the pre-storage area if the storage capacity is full, and the recorder 103 is configured to, in response to determining that the action of a specific person identified in the video and audio captured from the video capture unit 101 and the audio capture unit 102 is one that the specific person has never previously identified or the number of times of recognition less than a specific threshold, identifying video and audio with the action of the specific person in the video and audio stored in the pre-storage, video and audio about the action of a specific person are copied to a fixed storage area.

Optionally, a corresponding counter is sot in the recorder 103 for various actions of everyone. For example, selling counter 1 for Jessica watching TV, setting counter 2 for Tom watching TV, setting counter 3 for Jessica go to sleep, and setting counter 4 for Tom watching TV. The recorder 103 adds 1 to a counter corresponding to a specific action of the specific person in response to recognizing a specific action of a specific person from the collected video and audio, wherein the judgement on whether the action is an action which has never been recognized before or an action of which the number of times of recognition is less than a specific threshold is determined by referring to the counter. As described in connection with the first embodiment, a model is established in advance for various actions and stored in a storage. In this way, the recorder 103 identifies the action from the captured video and audio by searching the video and audio captured by the video capture unit 101, the audio capture unit 102 for a match with each model. The specific person is recognized based on, for example, one or more of face recognition, height recognition, and voice recognition. For example, initially, a counter corresponding to Jessica watching TV is initialized to zero. Then, the recorder 103 recognizes the action of watching TV according to the model matching, and recognizes that Jessica is watching television based on one or more of face recognition, height recognition, and voice recognition. If pre-set to start recording when the action is a previously unrecognized action for that specific person, record the Jessica watching TV action. Also, add 1 to the counter for Jessica watching TV. When the recorder 103 recognizes the Jessica TV for the second time, if it is preset to start recording when the action is a action that has never been recognized by the specific person before, since the value of the counter is not 0, it is not recorded. However, if it is preset to start recording when the number of recognized actions of the specific person is less than or equal to 1, recording will still be started. In the meantime, add 1 to the value of the counter corresponding to Jessica Watching TV.

Similar to the first embodiment, the smart recording system in the fourth embodiment may further include a depth sensor 197. The actions are identified based on the video and audio captured by the video capture unit 101, the audio capture unit 102, and the depth sensed by the depth sensor 197, respectively.

Similar to the first embodiment, the smart recording system in the fourth embodiment may also identify a specific person based on one or more of face recognition, height recognition, voice recognition, to enhance recognition accuracy of a specific person.

Similar to the first embodiment the smart recording system in the fourth embodiment may further include comprising: a transceiver 104, configured to, in response to determining that the action is a previously unrecognized action of the specific person or identify the number of times of recognition less than a specific threshold action, send notification to the trusted user.

Similar to the first embodiment, the transceiver 104 may also be configured to send the recorded content to a trusted user. This sending can be done after the recording is completed, or the recorded content can be sent to a trusted user in real time, so that, for example, a trusted user can take appropriate action based on the video and audio received in real time.

Similar to the first embodiment, the smart recording system in the fourth embodiment may further include a rotation device 204 that rotates the video capture unit 101.

Similar to the first embodiment, in response to determining that the action is a previously unidentified action of the specific person or an action of which the number of times of recognition is less than a specific threshold, the rotating device 101 may also cause the rotating device 101 to face the identified action and ready to record.

It should be understood that the block diagram shown in FIG. 1 is for the purpose of example only, and not intended to limit the scope of the invention. In some cases, some units or devices may be added or subtracted as the case may be.

Those skilled in the art will recognize that the present invention may be embodied as a device, an apparatus, a method, or a computer program product. Therefore, the present disclosure may be embodied in the form of complete hardware, complete software, or a combination of hardware and software.

The block diagrams in the figures show the possible architecture, functionality, and operation of possible implementations of systems and computer program products in accordance with various embodiments of the present invention. In this regard, each block of the block diagrams may represent a module, a section of a program, or a portion of code that includes one or more executable instructions for implementing the specified logical functions. It should also be noted that in some alternative implementations, the functions noted in the blocks may occur out of the order noted in the figures. For example, two consecutive blocks may in fact be executed substantially in parallel, and sometimes they may be executed in the reverse order, depending on the function involved. It is also to be noted that each block of the block diagrams, and combinations of blocks in the block diagrams, may be implemented by special purpose hardware-based systems that perform the specified functions or operations, or may be implemented by special purpose hardware and computer instructions Combination to achieve.

It will be apparent to those skilled in the art that the invention is not limited to the details of the foregoing exemplary embodiments, but that the present invention may be embodied in other specific forms without departing from the spirit or essential characteristics of the invention. Thus, the present examples are to be considered in all respects as illustrative and not restrictive, the scope of the invention being indicated by the appended claims rather than by the foregoing description, and thus is intended to be included in the claims, all changes which come within the meaning and range of equivalency of the appended claims are intended to be embraced therein. Any reference signs in the claims should not be construed as limiting the claim involved.

What is claimed is:

1. A smart recording system comprising:
   a computer comprising:
      a camera configured to capture video of a surrounding environment; and
      an audio device configured to capture audio of the surrounding environment;
   a recorder configured to:
      determine, in response to identifying an action from the captured video and audio, whether the action has a specific attribute, wherein the action comprises a specific person's specific action in a home;
      record, when the action is determined to have the specific attribute, the video and audio captured by the camera and the audio device to a fixed storage area;
      stop recording to the fixed storage area at an end of the action;
      identify, in response to the specific person's specific action in the home being identified from the captured video and audio, the specific person's specific action in the home from video and audio stored in a pre-storage area; and
      copy the identified video and audio of the specific person's specific action in the home to the fixed storage area;
   a transceiver configured to send a notification information to a trusted user in response to the specific person's specific action in the home, wherein the trusted user communicates with the smart recording system through a mobile communication manner and the trusted user is adjusted or self-determined by the smart recording system according to communication frequency, friend information, and family relationship; and
   a display configured to display user-configurable screens and to allow a user to select a person in the home to be recorded and the action in the home to be recorded;
   wherein the specific person is identified based on at least one of face recognition, height recognition, and voice recognition.

2. The smart recording system according to claim 1, wherein the recorder is configured to record video and audio captured by the camera and the audio device in real time to the pre-storage area, wherein the pre-storage area has a predetermined storage capacity, and wherein a post-recorded video and audio automatically overwrite an oldest recorded video and audio in the pre-storage area when the storage capacity is full.

3. The smart recording system according to claim 1, wherein the specific attribute comprises at least one of:
   dramatic changes in the video captured by the camera;
   an audio captured by the audio device above a certain threshold; and
   a dramatic change in audio captured by the audio device.

4. The smart recording system according to claim 1, wherein a model is previously established for various actions and the recorder is configured to search the captured video and audio captured by the camera and the audio device for matches to each model to identify actions from the captured video and audio.

5. The smart recording system according to claim 1, wherein the transceiver is configured to
   send a recorded content to the trusted user.

6. The smart recording system according to claim 1, comprising a rotating device for rotating the camera.

7. A smart recording system comprising:
   a computer comprising:
      a camera configured to capture video of a surrounding environment; and
      an audio device configured to capture audio of the surrounding environment;
   a recorder configured to:
      determine, in response to identifying an action from the collected video and audio, whether the action is an action that has never been identified before or an action of which a number of times of identification is less than a specific threshold, wherein the action comprises a specific person's specific action in a home;
      record, when the action is determined as being the action that has never been identified or whose number of times of identification is less than the specific threshold, the video and audio captured by the camera and the audio device to a fixed storage area, and stop recording to the fixed storage area in response to an end of the action;

identify, in response to determining that the specific person's specific action in the home identified in the video and audio captured from the camera and the audio device is the action that has never been identified before or the action of which the number of times of identification is less than the specific threshold, the video and audio of the specific person's specific action in the home in video and audio stored in a pre-storage area; and copy the video and audio including the identified specific person's specific action in the home to the fixed storage area;

a transceiver configured to send a notification information to a trusted user in response to determining that the specific person's specific action in the home has never been identified before or the action of which the number of times of identification is less than the specific threshold, wherein the trusted user communicates with the smart recording system through a mobile communication manner and the trusted user is adjusted or self-determined by the smart recording system according to communication frequency, friend information, and family relationship; and a display configured to display user-configurable screens and to allow a user to select a person in the home to be recorded and the action in the home to be recorded;

wherein the specific person is identified based on at least one of face recognition, height recognition, and voice recognition.

8. The smart recording system according to claim 7, wherein the recorder is configured to record the video and audio captured by the camera and the audio device in real time to the pre-storage area, wherein the pre-storage area has a predetermined storage capacity, and wherein a post-recorded video and audio automatically overwrite an oldest recorded video and audio in the pre-storage area when the storage capacity is full.

9. The smart recording system according to claim 7, wherein a corresponding counter is set for various actions in the recorder, wherein, in response to identifying an action from the captured video and audio, the recorder is configured to increment the corresponding counter that corresponds to the action by one, and wherein a judgement on whether the action is the action that has never been identified before or the action of which the number of times of identification is less than the specific threshold is determined by referring to the corresponding counter.

10. The smart recording system according to claim 7, wherein a model is previously established for various actions and the recorder is configured to search the captured video and audio captured by the camera and the audio device for matches to each model to identify actions from the captured video and audio.

11. The smart recording system of claim 7, comprising a rotating device,
wherein, in response to determining that the action is the action that has never been identified before or the action of which the number of times of identification is less than the specific threshold, the rotating device is configured to rotate the camera in a direction facing the recognized action to facilitate recording.

12. A smart recording system comprising:
a computer comprising:
a camera configured to capture video of a surrounding environment; and
an audio device configured to capture audio of the surrounding environment;

a recorder configured to:
determine, in response to identifying a specific person's action in a home from the captured video and audio, whether the action is a previously unidentified action of the specific person, or a number of times of recognition is less than a specific threshold;
store, in response to determining that the specific person's action in the home is the previously unidentified action of the specific person or the action of which the number of times of recognition is less than the specific threshold, the video and audio captured by the camera and the audio device to a fixed storage area;
stop recording to the fixed storage at an end of the specific person's action in the home;
identify, in response to determining that the specific person's action in the home identified in the video and audio captured from the camera and the audio device is one that the specific person in the home has never been previously identified or the number of times of identification is less than the specific threshold, video and audio with the specific person's action in the home in video and audio stored in a pre-storage area; and
copy the video and audio including the identified specific person's action in the home to the fixed storage area;

a transceiver configured to send a notification information to a trusted user in response to determining that the specific person's action in the home is a previously unidentified action of the specific person or the action of which the number of times of identification is less than the specific threshold, wherein the trusted user communicates with the smart recording system through a mobile communication manner and the trusted user is adjusted or self-determined by the smart recording system according to communication frequency, friend information, and family relationship; and a display configured to display user-configurable screens and to allow a user to select the specific person in the home to be recorded and the action in the home to be recorded;

wherein the action comprises the specific person's action, or the specific person's specific action; and wherein the specific person is identified based on at least one of face recognition, height recognition, and voice recognition.

13. The smart recording system according to claim 12, wherein the recorder is configured to record video and audio captured by the camera and the audio device in real time to the pre-storage area, wherein the pre-storage area has a predetermined storage capacity, and wherein a post-recorded video and audio automatically overwrite an oldest recorded video and audio in the pre-storage area when the storage capacity is full.

14. The smart recording system according to claim 13, wherein a corresponding counter is set for various actions in the recorder, wherein, in response to identifying an action from the captured video and audio, the recorder is configured to increment the corresponding counter that corresponds to the action by one, and wherein a judgement on whether the action is a previously unidentified action of the specific person or the action of which the number of times of identification is less than the specific threshold is determined by referring to the corresponding counter.

15. The smart recording system according to claim 13, wherein a model is previously established for various actions and the recorder is configured to search the captured video and audio captured by the camera and the audio device for matches to each model to identify actions from the captured video and audio.

16. The smart recording system according to claim 13, comprising a depth sensor, wherein the action is identified based on the video and audio captured by the camera and the audio device, respectively, and a depth sensed by the depth sensor.

17. The smart recording system of claim 13, comprising a rotating device, wherein, in response to determining that the action is the previously unidentified action of the specific person or the action of which the number of times of recognition is less than the specific threshold, the rotating device is configured to rotate the camera in a direction facing the identified action to facilitate recording.

* * * * *